(12) United States Patent
Kobayashi et al.

(10) Patent No.: US 8,256,265 B2
(45) Date of Patent: Sep. 4, 2012

(54) APPARATUS AND METHOD FOR INSPECTING SENSOR MODULE

(75) Inventors: Hiroshi Kobayashi, Yokkaichi (JP);
Masaki Nakiri, Ichinomiya (JP);
Nobuhiro Kohno, Toukai (JP)

(73) Assignee: DENSO CORPORATION, Kariya (JP)

( * ) Notice: Subject to any disclaimer, the term of this patent is extended or adjusted under 35 U.S.C. 154(b) by 902 days.

(21) Appl. No.: 12/318,257

(22) Filed: Dec. 23, 2008

(65) Prior Publication Data

US 2009/0158811 A1    Jun. 25, 2009

(30) Foreign Application Priority Data

Dec. 25, 2007    (JP) .................................. 2007-332444

(51) Int. Cl.
*G01P 21/00* (2006.01)
(52) U.S. Cl. ............................ 73/1.38; 73/1.37; 702/116
(58) Field of Classification Search .......... 73/1.37–1.38, 73/865.8; 702/96, 116
See application file for complete search history.

(56) References Cited

U.S. PATENT DOCUMENTS

| | | | |
|---|---|---|---|
| 2,788,654 A | 4/1957 | Wiancko et al. | |
| 5,421,187 A | 6/1995 | Morgan | |
| 7,680,620 B2 | 3/2010 | Umeda | |
| 8,037,758 B2 * | 10/2011 | Sato | 73/1.37 X |
| 8,042,377 B2 * | 10/2011 | Froman et al. | 73/1.37 |
| 8,065,104 B2 * | 11/2011 | Fiedler et al. | 73/1.38 X |
| 8,086,405 B2 * | 12/2011 | Han et al. | 73/1.38 X |
| 2006/0123908 A1 | 6/2006 | Ito | |
| 2007/0150221 A1 | 6/2007 | Babala et al. | |
| 2007/0163337 A1 * | 7/2007 | Loscher | 73/118.1 |

FOREIGN PATENT DOCUMENTS

| | | |
|---|---|---|
| JP | H03-216557 | 9/1991 |
| JP | A-H06-242077 | 9/1994 |
| JP | H08-240611 | 9/1996 |
| JP | H11-002643 | 1/1999 |
| JP | A-2001-305156 | 10/2001 |
| JP | A-2004-347587 | 12/2004 |
| JP | 2006-170620 | 6/2006 |
| JP | 2007-178402 | 7/2007 |

OTHER PUBLICATIONS

Extended European Search Report dated Apr. 21, 2011 issued in corresponding EP patent application No. 08021548.6-2213.
Office Communication mailed May 31, 2011 in corresponding JP application No. 2007332444 (and English translation).
Office Action dated Nov. 24, 2009 from the Japan Patent Office in the corresponding Japanese patent application No. 2007-332444 (English translation enclosed).

* cited by examiner

*Primary Examiner* — Thomas P Noland
(74) *Attorney, Agent, or Firm* — Posz Law Group, PLC

(57) ABSTRACT

The present invention provides, as one aspect, an apparatus for inspecting a sensor module including at least one held sensor in a housing having a plurality of outer surfaces. The held sensor detects acceleration or angular velocity. The apparatus includes a holding unit that has an apparatus-side surface and holds the housing in a state where one of the outer surfaces of the housing serving as a housing-side surface contacts the apparatus-side surface, a driving unit that moves the holding unit, a first obtaining unit that, in a state where the housing-side surface contacts the apparatus-side surface, obtains an output from the held sensor, at least one reference sensor that has a detection axis and is provided such that a direction of the detection axis matches a direction of a reference axis of the held sensor, and a second obtaining unit that obtains an output from the reference sensor.

10 Claims, 4 Drawing Sheets

APPARATUS AND METHOD FOR INSPECTING SENSOR MODULE

CROSS REFERENCE TO RELATED APPLICATION

This application is based on and claims the benefit of priority from earlier Japanese Patent Application No. 2007-332444 filed Dec. 25, 2007, the description of which is incorporated herein by reference.

BACKGROUND OF THE INVENTION

1. Technical Field of the Invention

The present invention relates to an apparatus and a method for inspecting a sensor module mounted on a vehicle and the like that detects acceleration and angular velocity of the vehicle.

2. Related Art

Conventionally, an acceleration sensor (referred to, hereinafter, as a G sensor) that detects acceleration in the direction of an axis (referred to, hereinafter, as a detection axis) is installed in a vehicle. The G sensor is used to actualize a navigation function and an anti-lock braking system (ABS) function of the vehicle by providing information regarding acceleration in the longitudinal direction of the vehicle to a vehicle control unit.

To ensure detection accuracy of the G sensor described above, a method (referred to, hereinafter, as a sensor inspection method) is known in which characteristics of the G sensor are inspected using gravitational acceleration G1 of the Earth (refer to, for example, Japanese Patent Laid-open Publication No. Heisei 3-216557). In the method, a G sensor is placed on a reference surface of which sufficient horizontalness is ensured by a level. The G sensor is placed such that the detection axis thereof is perpendicular to the reference surface. An output voltage is then measured. Next, the G sensor is rotated by 90° from this state, and an output voltage is similarly measured.

However, in the above-described conventional sensor inspection method, when the G sensor is placed on the reference surface, the axis perpendicular to the reference surface is required to be precisely aligned in the direction of the gravitational acceleration G1 of the Earth. In other words, a process for aligning the axis is required. Therefore, the inspection requires extra time and effort.

In recent years, the number of functions (for example, a skidding suppressing function and an automatic cruise function) included in a vehicle has been increasing. Under the circumstances, in addition to a G sensor that detects acceleration by using a detection axis in the longitudinal direction of the vehicle (referred to, hereinafter, as a longitudinal G sensor), a G sensor that detects acceleration by using a detection axis in the transverse direction of the vehicle (referred to, hereinafter as a transverse G sensor), a yaw sensor that detects angular velocity around a detection axis in the vertical direction of the vehicle, and the like are used.

To shorten assembly time in a manufacturing process of the vehicle and reduce the number of defects during the assembly, so-called modularization is performed. The modularization integrates electronic components, a plurality of sensors, and the like used to actualize various vehicle functions into a package.

Therefore, ultimately, the characteristics of each sensor are required to be measured in a state in which a plurality of sensors and the like are integrated into a package (referred to, hereinafter, as a sensor module), and the sensor module itself is required to be inspected.

However, in the conventional sensor inspection method, to handle so-called modularization of the sensors described above, size of an inspection apparatus is required to correspond to the increased size (increased weight) of the package. In addition, axis alignment of the reference surface of the heavy inspection apparatus is required to be precisely performed in a state in which the heavy sensor module is placed on the reference surface. Therefore, the inspection requires further extra time and effort.

SUMMARY OF THE INVENTION

To solve the above-described problems, an object of the present invention is to provide an apparatus and a method for inspecting a sensor module that can easily measure characteristics of individual sensors without requiring precise axis alignment.

In order to achieve the object, the present invention provides, as one aspect, an apparatus for inspecting a sensor module including at least one held sensor in a housing having a plurality of outer surfaces, the held sensor detecting acceleration in a direction of a reference axis or angular velocity around the reference axis, the apparatus comprising: a holding unit that has an apparatus-side reference surface and holds the housing in a state in which one of the outer surfaces of the housing serving as a housing-side reference surface is in contact with the apparatus-side reference surface; a driving unit that moves the holding unit; a first obtaining unit that, in a state in which the housing-side reference surface is in contact with the apparatus-side reference surface, obtains an output from the held sensor provided in the sensor module held by the holding unit; at least one reference sensor that has a detection axis and is provided integrally with the holding unit such that a direction of the detection axis matches a direction of the reference axis of the held sensor, the number of the at least one reference sensor being the same as the number of the at least one held sensors; and a second obtaining unit that obtains an output from the reference sensor.

DETAILED DESCRIPTION OF THE PREFERRED EMBODIMENTS

Embodiments of the present invention are hereinafter described with reference to the drawings.

<Sensor Module>

Figure 1:
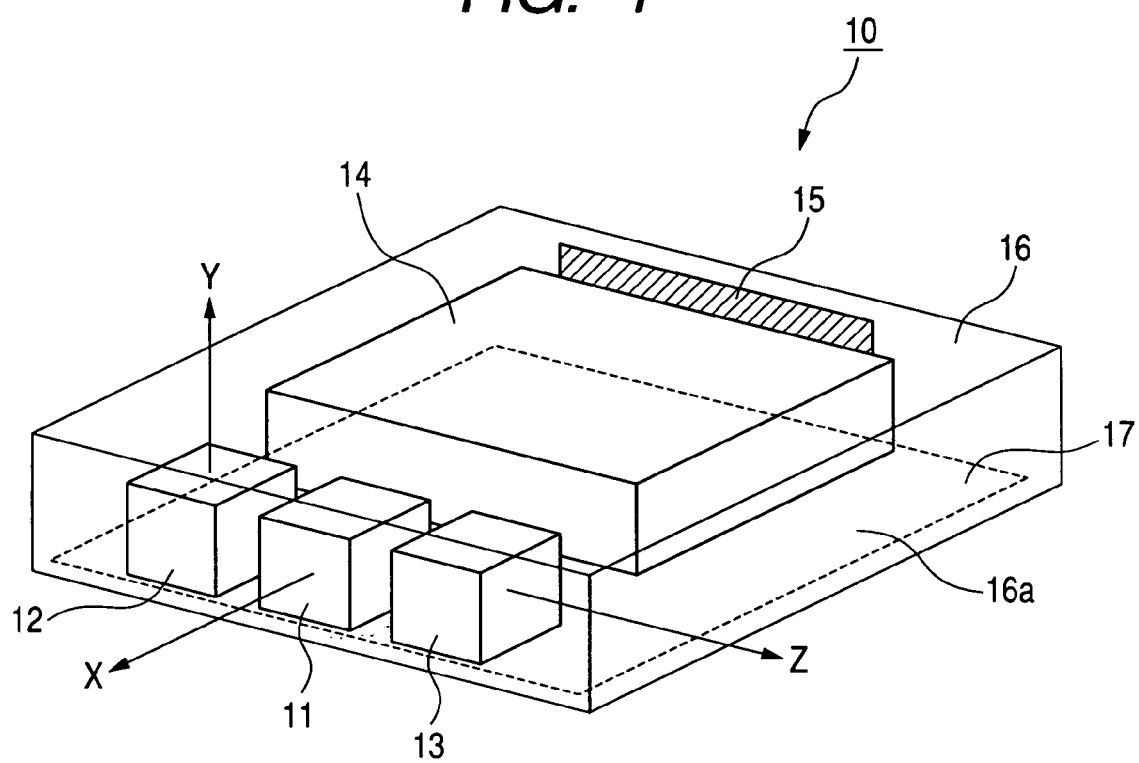
FIG. 1 is a perspective view of a sensor module which is an inspection subject of a sensor module inspection apparatus according to an embodiment of the present invention.

FIG. 1 is a perspective view of a sensor module which is an inspection subject of a sensor module inspection apparatus to which the present invention is applied. The sensor module is installed in a vehicle.

As shown in FIG. 1, a sensor module 10 includes an acceleration sensor (referred to, hereinafter, as a first G sensor) 11, an acceleration sensor (referred to, hereinafter, as a second G sensor) 12, a yaw sensor 13, a vehicle control unit (referred to, hereinafter, as an electronic control unit [ECU]) 14, a housing-side connector unit 15, and an ECU board 17, which are housed within a rectangular-solid housing 16. Three axes (X axis, Y axis, and Z axis) serve as detection axes of the sensor module 10. Each of the three axes is perpendicular to each of the outer surfaces of the housing 16. The three axes are perpendicular to one another.

The first G sensor 11 detects acceleration in the X-axis direction. The second G sensor 12 detects acceleration in the Y-axis direction. The yaw sensor 13 detects angular velocity around the Z axis. The ECU 14 performs, for example, a known ABS control process for suppressing wheel slip of the vehicle during braking and acceleration, based on detection signals inputted from sensors 11 to 13, a wheel speed sensor (not shown), and the like. The housing-side connector unit 15 outputs (transmits) the detection signals of the sensors 11 to 13 and control instructions of the ECU 14 to an external unit. The sensors 11 to 13, the ECU 14, and the housing-side connector unit 15 are disposed on the ECU board 17.

According to the embodiment, one surface, which is perpendicular to the Z axis, among the outer surfaces of the housing 16 is a housing-side reference surface 16a. In other words, the sensor module 10 is used in a state in which, for example, the housing-side reference surface 16a is attached to a vehicle-side installation surface of which sufficient horizontalness is ensured by a level.

<Apparatus Configuration>

Figure 2A:
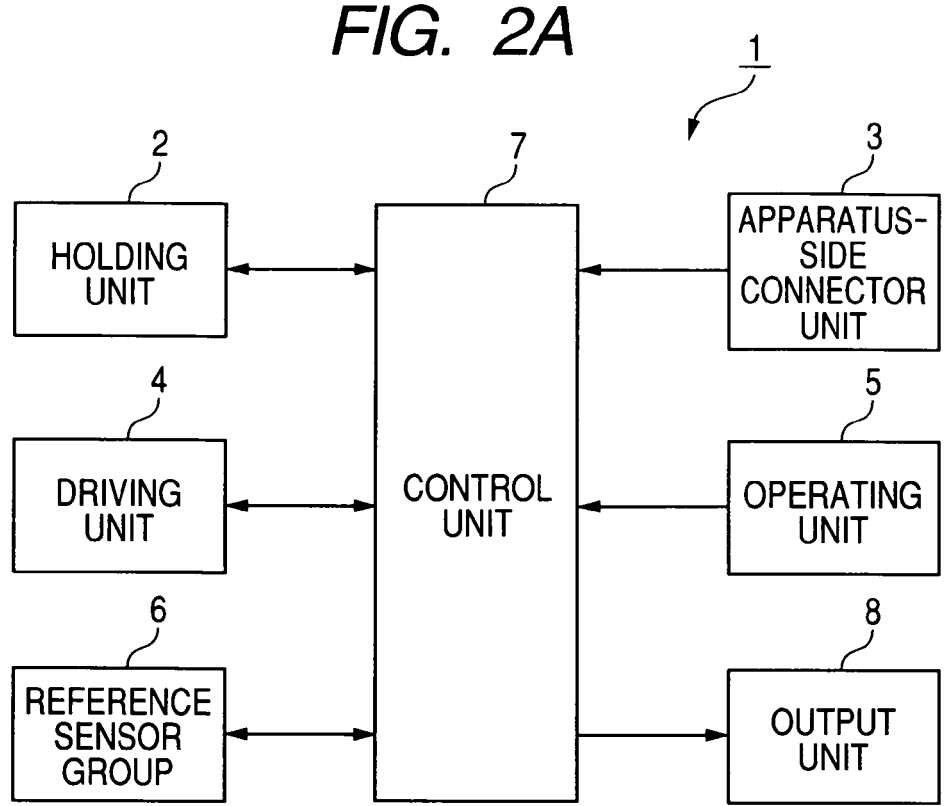
FIG. 2A is a block diagram of a configuration of the sensor module inspection apparatus according to the embodiment of the present invention.
Figure 2B:
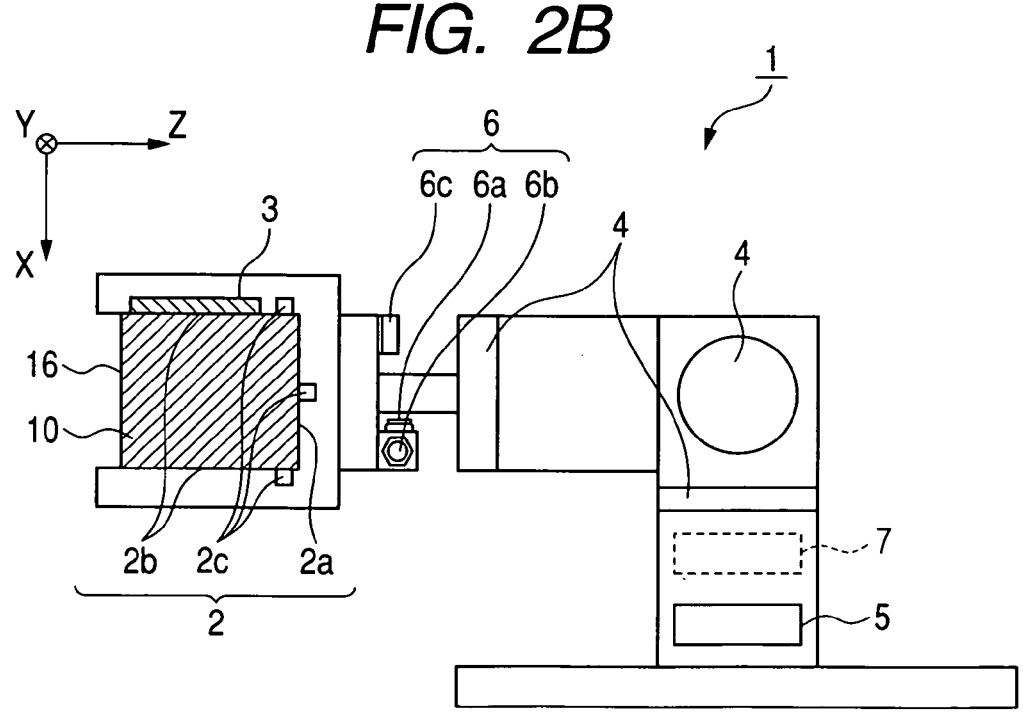
FIG. 2B is a schematic diagram of the configuration of the sensor module inspection apparatus according to the embodiment of the present invention.

FIG. 2A is a block diagram of a configuration of the sensor module inspection apparatus to which the present invention is applied. FIG. 2B is a diagram schematically showing the sensor module inspection apparatus and showing a placement of each element. A sensor module inspection apparatus 1 is an apparatus used to perform inspection of the sensor module 10. According to the embodiment, the sensor module inspection apparatus 1 is provided on a production line for the sensor module 10.

As shown in FIGS. 2A and 2B, the sensor module inspection apparatus 1 includes a holding unit 2, an apparatus-side connector unit 3, a driving unit 4, an operating unit 5, a reference sensor group 6, a control unit 7, and an output unit 8. The holding unit 2 holds the housing 16. The apparatus-side connector unit 3 engages with the housing-side connector unit 15 of the housing 16 held by the holding unit 2, thereby connecting to the sensors 11 to 13 via the housing-side connector unit 15. The driving unit 4 moves the holding unit 2 three-dimensionally, namely in three-dimensional directions. The operating unit 5 inputs operation instructions from an external source. The reference sensor group 6 includes a plurality of sensors. The number of the sensors is the same as the number of types of the sensors 11 to 13 (three in the embodiment). The reference sensor group 6 is provided integrally with the holding unit 2. The control unit 7 controls the holding unit 2 and the driving unit 4 based on inputs from the operating unit 5. The output unit 8 performs display or printing as described hereinafter.

The holding unit 2 includes a reference surface (referred to, hereinafter, as an apparatus-side reference surface) 2a and two (a pair of) chuck surfaces 2b and 2b. The reference surface 2a can come into contact with the housing-side reference surface 16a of the housing 16. The chuck surfaces 2b and 2b are perpendicular to the apparatus-side reference surface 2a and face each other. The holding unit 2 is formed into a U-shape turned sideways. The holding unit 2 is configured such that the chuck surfaces 2b and 2b can slide toward each other. The holding unit 2 holds the housing 16 by the chuck surfaces 2b and 2b which sandwich the housing 16 from both sides.

Detectors 2c are provided on the apparatus-side reference surface 2a and the pair of chuck surfaces 2b and 2b. The detectors 2c are used to detect a state in which the apparatus-side reference surface 2a and the pair of chuck surfaces 2b and 2b are in contact with the outer surfaces of the housing 16. The apparatus-side connector unit 3 is disposed on one chuck surface 2b of the pair of chuck surfaces 2b and 2b.

The driving unit 4 includes a plurality of motors and an actuator used to rotate the holding unit 2 on an axis perpendicular to the apparatus-side reference surface 2a and to move the holding unit 2 in a horizontal direction and a vertical direction. The driving unit 4 operates the motors and the actuator in combination, thereby moving the holding unit 2 three-dimensionally.

The reference sensor group 6 includes an acceleration sensor (referred to, hereinafter, as a first reference sensor) 6a, an acceleration sensor (referred to, hereinafter, as a second reference sensor) 6b, and a yaw sensor (referred to, hereinafter, as a third reference sensor) 6c. The direction of the detection axis of the first reference sensor 6a matches that of the reference axis (X axis) of the first G sensor 11. The direction of the detection axis of the second reference sensor 6b matches that of the reference axis (Y axis) of the second G sensor 12. The direction of the detection axis of the third reference sensor 6c matches that of the reference axis (Z axis) of the yaw sensor 13.

Here, the reference axes of sensors 11 to 13 of the sensor module 10 refer to detection axes oriented in directions which the detection axes should take in relation to the housing-side reference surface 16a. In other words, the reference sensors 6a to 6c are calibrated in advance such that the directions of the detection axes of the reference sensors 6a to 6c respectively match the directions of the reference axes of the sensors 11 to 13 when the sensor module 10 is held by the holding unit 2 in a state in which the housing-side reference surface 16a is in contact with the apparatus-side reference surface 2a, and the reference sensors 6a to 6c are then fixed.

The control unit 7 is mainly configured with a known microcomputer including a central processing unit (CPU), a read only memory (ROM), a random access memory (RAM), an input/output (I/O), a bus line connecting these elements, and the like. Among the elements, the ROM stores therein a driving program for driving the driving unit 4 to perform a prescribed operation and a main program for performing a sensor module inspection process described hereinafter. The CPU performs the sensor module inspection process described hereinafter based on the programs stored in the ROM.

<Sensor Module Inspection Process>

Figure 3:
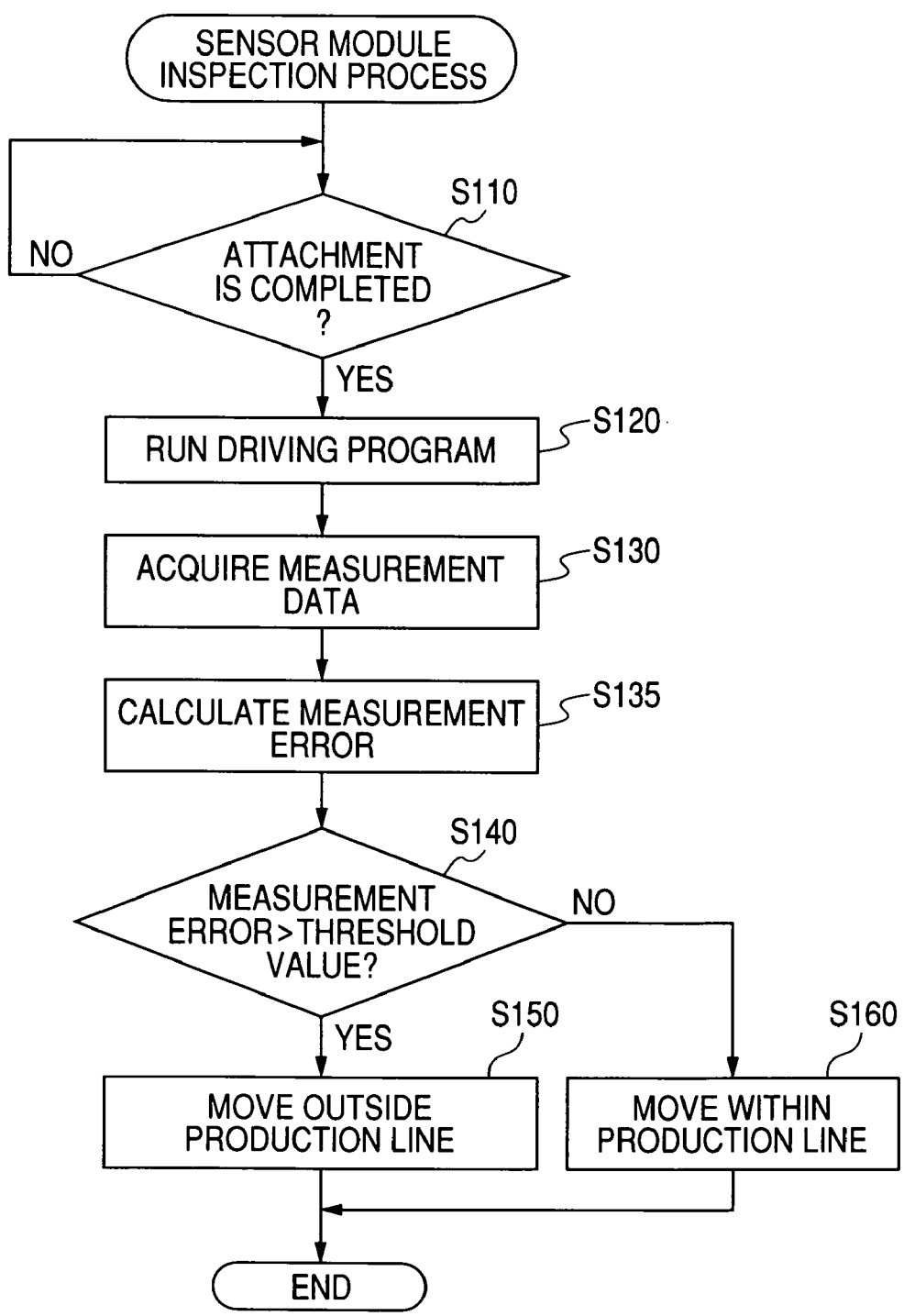
FIG. 3 is a flowchart of details of a sensor module inspection process according to the embodiment of the present invention.

Hereinafter, the sensor module inspection process performed by the control unit 7 will be described in detail with reference to a flowchart shown in FIG. 3. The process is started when the control unit 7 detects that an operation instruction for starting the process is inputted from the operating unit 5. The process is repeated until an operation instruction for completing the process is inputted.

When the process is started, in step S110, the control unit 7 determines whether the sensor module 10 is correctly attached to the holding unit 2. When the result of the determination is "Yes", the control unit 7 proceeds to step S120. When the result of the determination is "No", the control unit 7 waits.

A process for attaching the sensor module 10 to the holding unit 2 is described below. First, by using another driving unit provided on the production line, the housing 16 of the sensor module 10 is mounted on the holding unit 2 such that the housing-side reference surface 16a comes into contact with the apparatus-side reference surface 2a. Next, the control unit 7 slides the chuck surfaces 2b and 2b of the holding unit 2 towards each other to sandwich the housing 16.

Based on the input from each detector 2c provided in the holding unit 2, the control unit 7 checks that the sensor module 10 is in a state in which the outer surfaces of the housing 16 (including the housing-side reference surface 16a) are in contact with the apparatus-side reference surface 2a and the pair of chuck surfaces 2b and 2b. Based on input from the apparatus-side connector unit 3, the control unit 7 checks that the housing-side connector unit 15 is engaged with the apparatus-side connector unit 3. The control unit 7 then determines that the sensor module 10 is correctly attached to the holding unit 2.

In step S120, the control unit 7 reads the driving program stored in the ROM. Based on the driving program, the control unit 7 makes the driving unit 4 move the holding unit 2 three-dimensionally.

In subsequent step S130, the control unit 7 starts measuring output voltage of each reference sensor 6a to 6c. The control unit 7 also starts measuring output voltage of each sensor 11 to 13. The control unit 7 obtains the output voltage of each sensor 11 to 13 from the housing-side connector unit 15 of the sensor module 10 held by the holding unit 2, via the apparatus-side connector unit 3. The control unit 7 sequentially stores data (referred to, hereinafter, as measurement data) on the measured output voltage of each reference sensor 6a to 6c and each sensor 11 to 13 in the RAM.

In subsequent step S135, the control unit 7 sequentially calculates respective differences (referred to, hereinafter, as measurement errors) between measurement data of each reference sensor 6a to 6c and measurement data of each sensor 11 to 13 obtained in step S130. In other words, the control unit 7 calculates a difference between the measurement data of the reference sensor 6a and the measurement data of the sensor 11, a difference between the measurement data of the reference sensor 6b and the measurement data of the sensor 12, and a difference between the measurement data of the reference sensor 6c and the measurement data of the sensor 13.

Next, in step S140, the control unit 7 monitors measurement errors calculated in step S135 for a measurement time set in advance and determines whether a measurement error exceeding a threshold value set in advance is detected during the measurement time. When the result of the determination is "Yes", the control unit 7 proceeds to step S150. When the result of the determination is "No", the control unit 7 proceeds to step S160.

In step S150, upon detecting the measurement error exceeding the threshold in step S140, the control unit 7 completes the measurement of output voltage of each reference sensor 6a to 6c and sensor 11 to 13 and completes the driving program. The control unit 7 determines that the sensor module 10, which is the inspection subject, does not pass the inspection. The control unit 7 moves the sensor module 10 to a predetermined location outside the production line by using the driving unit 4 and completes the process.

On the other hand, in step S160 to which the control unit 7 proceeds when the measurement error exceeding the threshold is not detected during the measurement time, the control unit 7 determines that the sensor module 10, which is the inspection subject, passes the inspection. The control unit 7 moves the sensor module 10 to a predetermined location on the production line by using the driving unit 4 and completes the process.

When the sensor module 10 is moved to a predetermined location in step S150 or in step S160, the control unit 7 slides the chuck surfaces 2b and 2b of the holding unit 2 to allow the sensor module 10 to be removed.

Effects of the Embodiment

As described above, in the sensor module inspection apparatus 1 according to the embodiment, each reference sensor 6a to 6c is provided integrally with the holding unit 2 so as to have a detection axis matching the axis (reference axis) perpendicular to each of the apparatus-side reference surface 2a and the chuck surfaces 2b and 2b of the holding unit 2. The control unit 7 measures output voltage of the sensors 11 to 13 of the sensor module 10 and output voltage of the reference sensors 6a to 6c while the driving unit 4 moves the holding unit 2 three-dimensionally.

Therefore, in the sensor module inspection apparatus 1 according to the embodiment, both the output voltage of each sensor 11 to 13 of the sensor module 10 held by the holding unit 2 in a state in which the housing-side reference surface 16a is in contact with the apparatus-side reference surface 2a and the output voltage of each reference sensor 6a to 6c of the reference sensor group 6 can be simultaneously obtained.

Therefore, in the sensor module inspection apparatus 1 according to the embodiment, by successively comparing the differences between the output voltages obtained from the sensor module 10 and the output voltages obtained from the reference sensor group 6, the sensor module 10 including the plurality of sensors 11 to 13 can be easily inspected without a process for axis alignment in which the axis perpendicular to the apparatus-side reference surface 2a is absolutely aligned in the direction of the gravitational acceleration G1 of the Earth.

Moreover, in the sensor module inspection apparatus 1, whether the sensor module 10 passes the inspection is determined based on whether the output voltage difference (measurement error) between the output voltage of each reference sensor 6a to 6c and the output voltage of each sensor 11 to 13 of the sensor module 10 does not exceed a threshold value. Based on the determination result, the sensor module 10, which is the inspection subject, is moved within the production line or outside the production line.

Therefore, in the sensor module inspection apparatus 1, the determinations regarding the inspection of sensor modules 10 are performed, and sensor modules 10 which have passed the inspection and the sensor modules 10 which have not passed the inspection are automatically separated. As a result, time and effort required to inspect the sensor modules 10 are further reduced. Consequently, production efficiency of the sensor modules 10 can be improved.

Other Embodiments

According to the above-described embodiment, a method is described for inspecting the sensor module 10 by comparing the output voltage of each sensor 11 to 13 of the sensor module 10 which is the inspection subject (output from the inspection subject) with the output voltage of each reference sensor 6a to 6c provided integrally with the holding unit 2. However, the method is not limited thereto.

For example, a sensor module in which a single detection axis is calibrated to be perpendicular to the housing-side reference surface 16a (or each one of a plurality of detection axes is calibrated to be perpendicular to each one of the outer surfaces of the housing 16 and to be perpendicular to the others of the plurality of detection axes) may serve as a master module. An output voltage of a sensor (master sensor)

included in the master module may be compared with an output voltage of a sensor included in a sensor module which is the inspection subject.

Specific details are described below. It is presumed that the holding unit 2 is moved by the same driving operation according to the driving program. In a manner similar to the measurement of the output voltage of each sensor 11 to 13 of the sensor module 10, output voltage (measurement data) of each master sensor of the master module obtained by a first measurement is stored in a memory (for example, an electrically erasable programmable read-only memory [EEPROM]). Then, whether the sensor module 10 passes the inspection is determined based on whether differences (measurement errors) between the output voltages (measurement data) of sensor 11 to 13 of the sensor module 10, which is the inspection subject, obtained by subsequent measurements and the measurement data of the master sensors stored in the memory do not exceed a threshold value.

In this case, the reference sensor group 6 (reference sensors 6a to 6c) may be omitted from the configuration of the sensor module inspection apparatus 1.

According to the embodiment, the sensor module 10 includes a two-axis G sensor and a single-axis yaw sensor. The configuration is not limited thereto. Various combinations of sensor types (G sensor or yaw sensor) included in the sensor module 10 and the number (one to three) of detection axes (reference axes) may be considered. The sensor module inspection apparatus 1 may include reference sensors corresponding to the variations. Alternatively, a method may be used in which a master module including a master sensor corresponding to the combinations is used.

Figure 4:
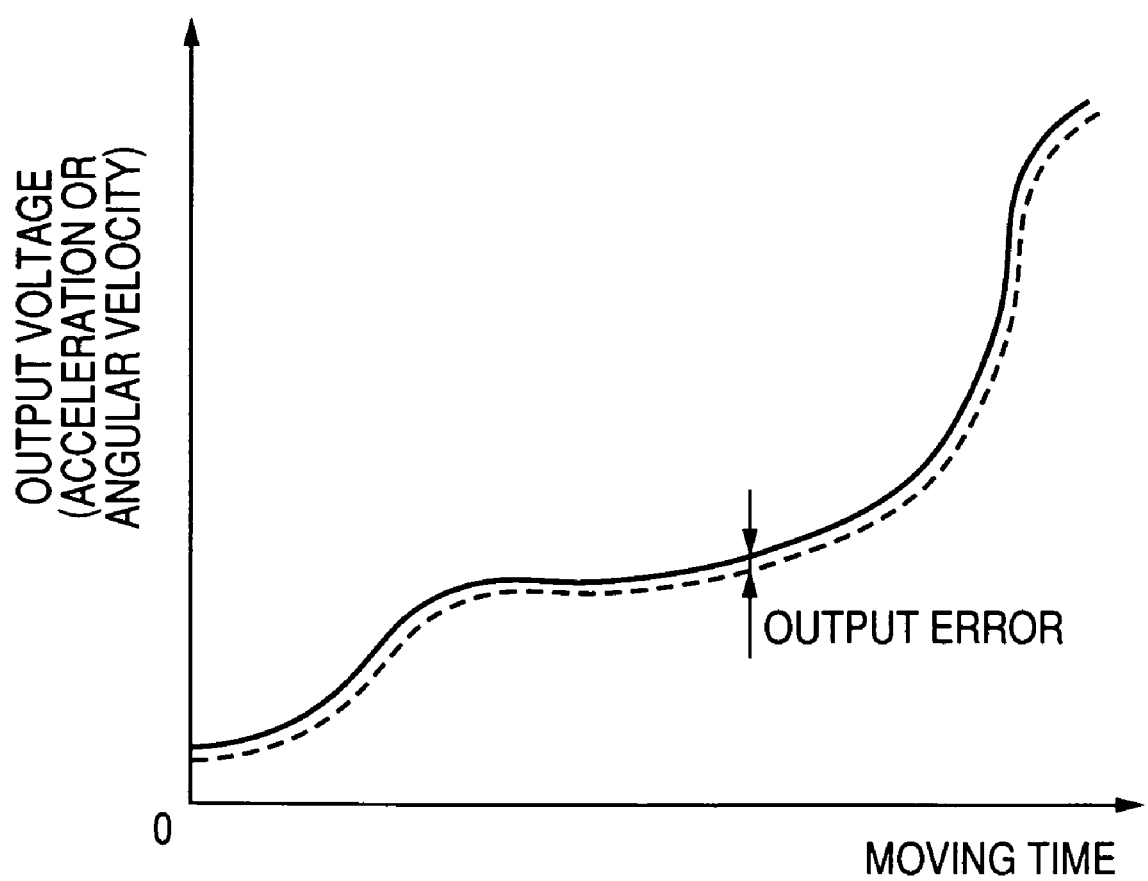
FIG. 4 is a graph of an example of measurement results according to the embodiment of the present invention.

Moreover, according to the embodiment, the sensor module detection apparatus 1 determines whether the sensor module 10 passes the inspection. However, the determination is not limited thereto. For example, as shown in FIG. 4, output results of the sensors 11 to 13 and the reference sensors 6a to 6c may be displayed in the output unit 8 or printed out from the output unit 8. The inspector can determine whether the sensor module 10 passes the inspection based on outputted errors.

According to the embodiment, although the housing 16 is a rectangular-solid, the shape of the housing 16 is not limited thereto. Any shape can be used as long as the housing 16 has a surface that can abut on the apparatus-side reference surface 2a and the pair of chuck surfaces 2b and 2b.

[Summary]

The sensor module inspection apparatus described above is used to inspect the sensor module 10 that includes at least one sensor that detects acceleration in a reference axis direction or angular velocity around the reference axis (in other words, an acceleration sensor or a yaw sensor).

Specifically, the holding unit 2 holds a housing that encloses the sensor module 10 in a state in which one outer surface (referred to, hereinafter, as a housing-side reference surface) of the housing is in contact with a reference surface (referred to, hereinafter, as an apparatus-side reference surface) set in advance. The driving unit 4 moves the holding unit 2 three-dimensionally (in three dimensional directions). The driving unit 4 may randomly move the holding unit 2 and is not required to move the holding unit 2 such that an axis perpendicular to the housing-side reference surface and the apparatus-side reference surface is aligned in the direction of the gravity acceleration G1 of the Earth.

The holding unit 2 includes sensors (6) provided integrally with the holding unit 2. The number of the sensors (6) is the same as the number of types of held sensors (sensors to be held) (11, 12, and 13). Detection axes (referred to, hereinafter, as reference axes) which the held sensors (11, 12, and 13) should have in relation to the apparatus-side reference surface match detection axes of the sensors (6) (referred to, hereinafter, as reference sensors). In other words, when the direction of the reference axis of the held sensor matches the direction of the detection axis of the reference sensor in relation to the apparatus-side reference surface, the reference axis of the held sensor is oriented in the direction that should be taken in relation to the housing-side reference surface.

Here, a first obtaining means (control unit 7) obtains outputs from sensors (referred to, hereinafter, as held sensors (sensors to be held)) (11, 12, and 13) included in a sensor module (referred to, hereinafter, as a held module (module to be held)) 10 held by the holding unit 2 in a state in which the housing-side reference surface is in contact with the apparatus-side reference surface. A second obtaining means (control unit 7) obtains outputs from the reference sensors (6a, 6b, and 6c).

In the sensor module inspection apparatus configured as described above, when the sensor module 10 is held and moved three dimensionally (randomly), the reference sensors move in the same operation as that of the held sensors. Output from the held sensor and output from the reference sensor can be obtained simultaneously. Then, as a result of relative comparison of both outputs, the inspection of the sensor module 10 can be performed.

Therefore, in the sensor module inspection apparatus described above, unlike the conventional inspection apparatus, an axial alignment process is not required in which the axis perpendicular to the apparatus-side reference surface is absolutely aligned in the direction of the gravitational acceleration G1 of the Earth. Thus, the sensor module can be inspected easily.

As a first sensor module inspection method, first, a process (holding process) is performed in which the holding unit 2 holds the housing such that the apparatus-side reference surface is in contact with the housing-side reference surface by using the above-described sensor module inspection apparatus.

Then, after the holding process, a process (output obtaining process) is performed in which the driving unit 4 moves the holding unit 2 three-dimensionally, the first obtaining means obtains output from the held sensor, and the second obtaining means obtains output from the reference sensor.

Finally, a process (determination process) is performed in which whether the held module passes the inspection is determined based on whether the difference between the output from the held sensor and the output from the reference sensor, which are simultaneously obtained in the output obtaining process, does not exceed a predetermined threshold value.

Alternatively, as a second sensor module inspection method, a simplified sensor module inspection apparatus may be used.

In other words, instead of using the reference sensors provided integrally with the holding unit 2, sensors (referred to, hereinafter, as master sensors) installed within a housing are used. The number of the master sensors is the same as the number of sensors (referred to, hereinafter, as measured sensors (sensors to be measured)) included in a sensor module (referred to, hereinafter, as an inspected module (module to be inspected)) 10 which is the inspection subject. The directions of axes of the master sensors match the directions of reference axes (referred to, hereinafter, as reference directions) of the measured sensors that should be taken in relation to the housing-side reference surface. As the master sensors, for example, sensors included in a held module (sensor module) that has passed the inspection by, for example, the first sensor module inspection method may be used.

Specifically, a sensor module inspecting apparatus including the holding unit 2, the driving unit 4, and the output obtaining means (control unit 7) is used. First, a process (first holding process) is performed in which the holding unit 2 holds the housing of the sensor module in which the master sensors are provided, such that the housing-side reference surface is in contact with the apparatus-side reference surface. Note that the output obtaining means is a means for obtaining outputs from the measured sensors held by the holding unit 2 in a state in which the housing-side reference surface is in contact with the apparatus-side reference surface.

Next, after the first holding process, a process (storing process) is performed in which the driving unit 4 moves the holding unit 2 three-dimensionally by a predetermined driving operation and stores outputs from the master sensors obtained by the output obtaining means. Then, the sensor module is removed from the holding unit 2.

Then, a process (second holding process) is performed in which the holding unit 2 holds the housing of the inspected module enclosing measured sensors such that the housing-side reference surface is in contact with the apparatus-side reference surface. After the second holding process, a process (output obtaining process) is performed in which the driving unit 4 moves the holding unit 2 three-dimensionally and the output obtaining means obtains outputs from the measured sensors.

Finally, a process (determining process) is performed in which whether the inspected module passes the inspection is determined based on whether differences between the outputs from the measured sensors (held sensors) obtained in the output obtaining process and the outputs from the master sensors stored in the storing process do not exceed a predetermined threshold value.

In other words, in the first sensor module inspection method, since the reference sensors are provided integrally the holding unit 2, outputs from the held sensors and outputs from the reference sensors are simultaneously obtained, and the outputs from the reference sensors are not required to be stored. On the other hand, in the second sensor module inspection method, the reference sensors are not required to be provided in the holding unit 2, and the configuration of the inspection apparatus can be simplified.

It will be appreciated that the present invention is not limited to the configurations described above, but any and all modifications, variations or equivalents, which may occur to those who are skilled in the art, should be considered to fall within the scope of the present invention.

What is claimed is:

1. An apparatus for inspecting a sensor module including at least one held sensor in a housing having a plurality of outer surfaces, the held sensor detecting acceleration in a direction of a first reference axis or angular velocity around the first reference axis, the apparatus comprising:
    a holding unit that has an apparatus-side reference surface and holds the housing in a state in which one of the outer surfaces of the housing serving as a housing-side reference surface is in contact with the apparatus-side reference surface;
    a driving unit that moves the holding unit;
    an obtaining unit that, in a state in which the housing-side reference surface is in contact with the apparatus-side reference surface, obtains a first output from a held sensor provided in a master module held by the holding unit, and a second output from the at least one held sensor provided in the sensor module held by the holding unit; and
    a determining unit that determines whether the sensor module passes inspection based on a difference between the first output obtained by the obtaining unit and the second output obtained by the obtaining unit, wherein
    the driving unit is adapted to move the holding unit in three-dimensional directions.

2. The apparatus according to claim 1, further comprising:
    an output unit that outputs a result of the first output obtained by the obtaining unit and a result of the second output obtained by the obtaining unit.

3. The apparatus according to claim 1, wherein:
    the determining unit determines whether the sensor module passes inspection by comparing the difference between the first output and the second output to a threshold value.

4. The apparatus according to claim 1, wherein:
    the sensor module includes a first held sensor, a second held sensor, and a third held sensor,
    the first held sensor detects one of acceleration in a direction of the first reference axis or angular velocity around the first reference axis,
    the second held sensor detects one of acceleration in a direction of a second reference axis or angular velocity around the second reference axis,
    the third held sensor detects one of acceleration in a direction of a third reference axis or angular velocity around the third reference axis,
    the master module includes a first test sensor, a second test sensor, and a third test sensor,
    the first test sensor detects one of acceleration in a direction of the first reference axis or angular velocity around the first reference axis,
    the second test sensor detects one of acceleration in a direction of the second reference axis or angular velocity around the second reference axis,
    the third test sensor detects one of acceleration in a direction of the third reference axis or angular velocity around the third reference axis, and
    the first, second, and third reference axes are mutually perpendicular to each other.

5. The apparatus according to claim 4, wherein:
    the first output includes first measurements from the first, second, and third test sensors, and
    the second output includes second measurements from the first, second, and third held sensors.

6. An apparatus for inspecting a sensor module including a plurality of held sensor elements in a housing having a plurality of outer surfaces, the plurality of held sensors detecting one of acceleration in a direction of a first reference axis and angular velocity around the first reference axis, one of acceleration in a direction of a second reference axis and angular velocity around the second reference axis, and one of acceleration in a direction of a third reference axis and angular velocity around the third reference axis, the apparatus comprising:
    a holding unit that has an apparatus-side reference surface and holds the housing in a state in which one of the outer surfaces of the housing serving as a housing-side reference surface is in contact with the apparatus-side reference surface;
    a master module secured to the holding unit, the master module including a plurality of testing sensor elements configured to detect one of acceleration in the direction of the first reference axis and angular velocity around the first reference axis, one of acceleration in the direction of the second reference axis and angular velocity around the second reference axis, and one of acceleration in the direction of the third reference axis and angular velocity around the third reference axis;

a driving unit that moves the holding unit;

an obtaining unit that, in a state in which the housing-side reference surface is in contact with the apparatus-side reference surface, obtains a first output from the plurality of testing sensor elements provided in the master module, and a second output from the plurality of held sensor elements provided in the sensor module; and a determining unit that determines whether the sensor module passes inspection based on a difference between the first output obtained by the obtaining unit and the second output obtained by the obtaining unit, wherein the driving unit is adapted to move the holding unit in three-dimensional directions.

7. The apparatus according to claim 6, further comprising:

an output unit that outputs a result of the first output obtained by the obtaining unit and a result of the second output obtained by the obtaining unit.

8. The apparatus according to claim 6, wherein:

the determining unit determines whether the sensor module passes inspection by comparing the difference between the first output and the second output to a threshold value.

9. The apparatus according to claim 6, wherein:

the held sensor includes a first held sensor element, a second held sensor element, and a third held sensor element, the first held sensor element detects one of acceleration in a direction of the first reference axis or angular velocity around the first reference axis, the second held sensor element detects one of acceleration in a direction of a second reference axis or angular velocity around the second reference axis, the third held sensor element detects one of acceleration in a direction of a third reference axis or angular velocity around the third reference axis, the master module includes a first test sensor element, a second test sensor element, and a third test sensor element, the first test sensor element detects one of acceleration in a direction of the first reference axis or angular velocity around the first reference axis, the second test sensor element detects one of acceleration in a direction of the second reference axis or angular velocity around the second reference axis, the third test sensor element detects one of acceleration in a direction of the third reference axis or angular velocity around the third reference axis, and the first, second, and third reference axes are mutually perpendicular to each other.

10. The apparatus according to claim 9, wherein:

the first output includes first measurements from the first, second, and third test sensor elements, and the second output includes second measurements from the first, second, and third held sensor elements.

* * * * *